Nov. 2, 1926.  
T. W. CASE  
METHOD OF PRODUCING SLOT UNITS  
Filed June 1, 1925
1,605,530
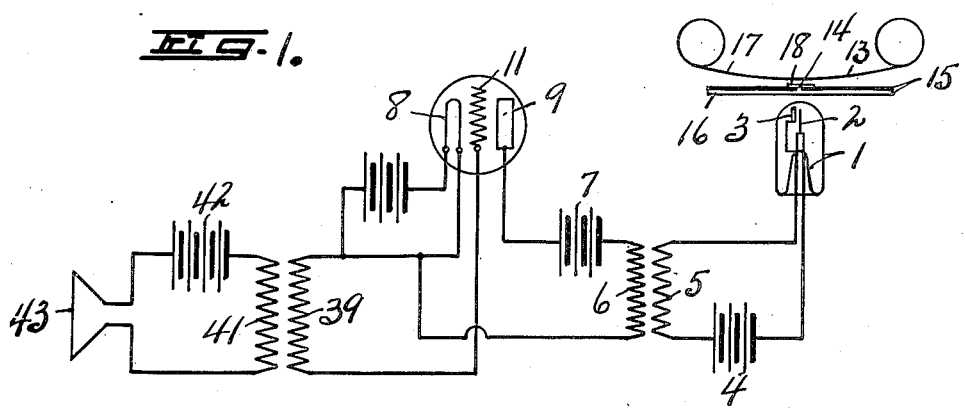
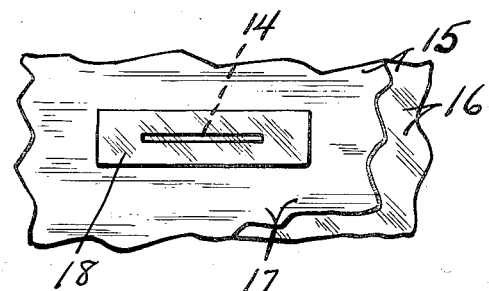
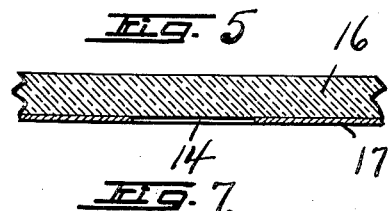
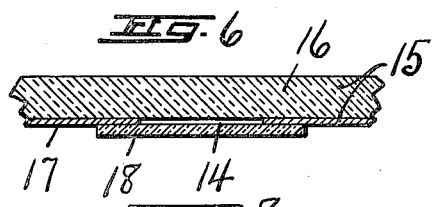
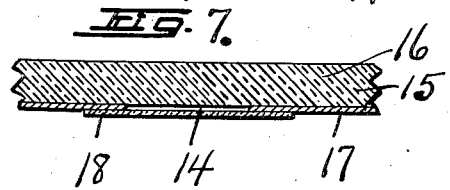
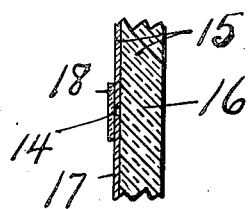
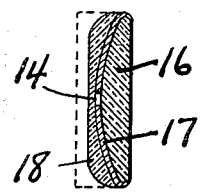
WITNESS
INVENTOR  
Theodore W. Case  
BY Denison Thompson  
ATTORNEYS Patented Nov. 2, 1926.

1,605,530

UNITED STATES PATENT OFFICE.

THEODORE WILLARD CASE, OF AUBURN, NEW YORK, ASSIGNOR TO CASE RESEARCH LABORATORY INCORPORATED, OF AUBURN, NEW YORK, A CORPORATION OF NEW YORK.

METHOD OF PRODUCING SLOT UNITS.

Application filed June 1, 1925. Serial No. 34,207.

This invention relates to a certain new and improved method of producing an apparatus for taking, printing, or reproducing a film record, and more specifically to a method of manufacturing an apparatus for use in producing a film record of light variations as caused by electric variations preferably corresponding to sound wave variations, as for instance, articulate sound waves.

In apparatus of this character for producing or reproducing a film record of light variations, it has been customary to move the film past a small printing slot in a wall disposed between the film and a source of light, and it is preferable that the film move past the slot in substantial contact with the wall so that only the portion of the film directly in front of the slot is exposed to the light emanating from the source, altho some spacing is possible under various conditions.

Considerable difficulty has been experienced in producing an accurate, clear and exact film record, and also in reproducing accurately the original sound from a record, due to the fact that dust, film material, or foreign matter collects in the slot,—more particularly is scraped off the film record or dragged along by it as it passes by the edge of the slot, and this foreign material partially obstructs the slot which is extremely small, and may be of various forms and shapes for different purposes, as for illustration, .001 of an inch in width and .1 of an inch in length, when used in taking or reproducing talking pictures, or the slot or slit may be round or square and of very small area, as for instance, in picture transmission or reception. And the result is that the film record produced is somewhat unsatisfactory because of this obstruction of the slot, and for the same reason a reproduction of even a perfect film record or picture is unsatisfactory.

The object of this invention is the production of a method of manufacturing a slit or slot unit, retaining all of the advantages of the present similar apparatus, but avoiding or partially avoiding the disadvantages above set forth.

More specifically this invention is addressed to a method of producing a slot-containing unit in itself of novel construction, and adapted for use in either picture-taking or picture reproducing apparatus, or in picture transmission or reception, as above set forth, the unit as a product being claimed in an application filed of even date herewith.

Other objects and advantages relate to the details of the method for producing a slot-containing unit, all as will more fully appear from the following description, taken in connection with the accompanying drawings, in which:—

Figure 1 is a diagrammatic illustration of an apparatus for producing a film record of light variations as effected by electrical variations corresponding to articulate sound waves or musical tones.

Figure 2 is an elevation of a portion of the slot-containing unit of this invention.

Figures 3, 4, 5, 6 and 7 are sectional views illustrating the separate steps of the method of this invention.

Figure 8 is a section taken at right angles to Fig. 7.

Figure 9 is a view of a modified form of unit.

In a general way, the structure of Figure 1 is the same as that disclosed in my application Serial No. 719,098, filed June 10, 1924, and comprises a variable source of cathode rays including two spaced electrodes —2— and —3— enclosed in a bulb —1—, the electrodes being connected in circuit with a source of potential as a battery —4— and a secondary —5— of a transformer, the primary —6— of which is connected in circuit with a source of potential —7— across the filament —8— and plate —9— of a space-discharge device —10—, the grid —11— of which is connected in circuit with the filament —8— and the secondary —39— of a transformer, the primary —41— of which is connected in circuit with a source of potential, as a battery —42— and a microphone —43—.

In a general way, this structure includes means for varying an electric current in accordance with sound-wave variations, and for amplifying such variations, and thereby effecting amplified variations in the source of light —1—, the light rays emanating from which are adapted to be printed or photographed upon the film —13— moving past the narrow slot —14— in the slot-containing unit —15—. This slot-containing unit 15 may be a portion of an enclosure for the film, or a portion of an enclosure for the lamp, and takes the place of the ordinary portion of a photographing apparatus or reproducing apparatus which contains the usual slot past which it is quite essential that the film should move in tight relation with the walls bordering the slot.

This slot-containing unit is of novel manufacture and construction, and as here shown, consists of a sheet of transparent material, as the quartz or glass sheet —16— of any suitable shape and size, and the word "glass" as used in the specification and claims hereof is deemed to include quartz.

Upon one face of the piece of glass 16 there is formed a layer 17 of opaque material, such as metal, and perhaps preferably silver produced in such a way that the metal is strongly adhered to the glass. The opaque material should be deposited on the glass in the form of minutely sub-divided particles and preferably this layer of opaque material, such as silver, may perhaps preferably be evaporated upon the glass, or may be electrically, chemically, or by cathode sputtering deposited thereon so as to form a very thin coating or sheet of metal upon one side of and firmly adhered to the surface the the glass plate —16—.

Any suitable opaque material may be utilized for this purpose, but I have found that silver effects a very satisfactory result. A very thin layer of deposited silver, less than .001 of an inch in thickness, and preferably less than .0005 of an inch in thickness, is highly efficient for my purpose. In the drawings it has been desirable to greatly exaggerate the thickness of the component parts for the purpose of clarity.

When the thin coating of opaque material has been produced upon the glass in any suitable manner, as for instance, one of those described, a slot or slit is ruled in the metal, or in other words, a small portion of the metal is scraped off the glass so as to expose a portion of the glass plate through the metal, and this may be effected in any suitable way, but in such a manner as not to scratch the glass or other transparent support, as by a metal tool or diamond point or the like, so as to produce a slot or opening through the metal of a proper length and width, a size suitable for this purpose being .001 of an inch in width and .1 of an inch in length when used for talking picture work.

After a sharply defined slot 14 as described, has been formed through the opaque coating 17, this slot is covered by a strip or sheet 18 of glass, quartz or similar material, and the term "glass" as used in the claims hereof is deemed to include quartz, and this strip 18 of glass may be secured to the opaque coating 17 in any suitable manner, as by transparent cement, such as Canada balsam. This strip or sheet 18 of glass may be of any suitable area so long as it is larger than the slot 14 and completely covers the slot. The glass sheet 18 may be of a thickness adapting it for handling, and for securement to the metallic or opaque layer 17 without breaking, and for that reason is, when secured in place considerably thicker than efficient use in the finished product permits, and for that reason after being secured in position, as perhaps best illustrated in Figure 6, the comparatively thick sheet of glass 18 is subjected to a grinding operation which can be effected in any suitable manner, by any suitable and well known tools so that its thickness is reduced to substantially .001 of an inch, or less, whereupon the product is in condition for efficient and satisfactory use.

Figure 3 illustrates the glass backing or sheet 16 which need not necessarily be glass, but may be of any suitable transparent material. In Fig. 4 the metallic coating 17 is illustrated as deposited upon the sheet 16. In Figure 5 the slot 14 is ruled in the opaque coating 17. Figure 6 shows the comparatively thicker sheet of glass 18 as secured in place across the slot, while Figure 7 illustrates the sheet 18 as ground down to the desired thickness for the completed product. Figure 9 illustrates a modified form in which the glass support 16 is in the form of a segment of a cylinder, and the covering plate 18 is concave to fit the deposited opaque layer and flat upon its front face with its edges rounded off.

The method here described is peculiarly efficient for the production of the product described, in that by this means a highly efficient slot or slit is produced which is entirely protected from the entry of foreign material, and by means of a glass plate upon the side toward the film, which is of such exceeding thinness as to be practically negligent in effecting the passage of the film across the slot unit, and altho I have shown and described a specific method of producing the slot unit described, I do not desire to restrict myself to the details of the method except as the same may be specifically set forth in the claims hereto appended.

I claim:—

1. The method of producing a slot-containing unit comprising forming a layer of an opaque material upon a transparent background, forming a narrow elongated slot in the opaque layer to expose the transparent background, covering the side of the slot opposite the transparent background with a sheet of glass, and then grinding the glass sheet to the thickness desired.

2. The method of producing a slot containing unit comprising forming a layer of an opaque material with a slot therein, securing a sheet of transparent material across the slot and then grinding the sheet of transparent material to a thickness not substantially greater than .005 of an inch.

3. The method of forming a slot-containing unit comprising a deposited layer of silver upon a sheet of glass, forming a narrow slot in the layer of silver and covering the open side of the slot with a glass sheet, and then grinding the glass sheet to the thickness desired.

In witness whereof I have hereunto set my hand this 25th day of May, 1925.

THEODORE WILLARD CASE.